(12) United States Patent
Wu et al.

(10) Patent No.: US 12,739,465 B2
(45) Date of Patent: Sep. 15, 2026

(54) INFORMATION INTERACTION METHOD, DEVICE, ELECTRONIC APPARATUS AND STORAGE MEDIUM

(71) Applicant: Beijing Zitiao Network Technology Co., Ltd., Beijing (CN)

(72) Inventors: Peipei Wu, Beijing (CN); Liyue Ji, Beijing (CN); Xiaolin Li, Beijing (CN); Yang Wu, Beijing (CN); Yan Zhao, Beijing (CN)

(73) Assignee: Beijing Zitao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/728,337

(22) PCT Filed: Apr. 27, 2023

(86) PCT No.: PCT/CN2023/091234
§ 371 (c)(1),
(2) Date: Jul. 11, 2024

(87) PCT Pub. No.: WO2023/231666
PCT Pub. Date: Dec. 7, 2023

(65) Prior Publication Data

US 2025/0097515 A1 Mar. 20, 2025

(30) Foreign Application Priority Data

May 31, 2022 (CN) ......................... 202210612147.0

(51) Int. Cl.
*H04N 21/431* (2011.01)
*H04N 21/2187* (2011.01)
*H04N 21/4788* (2011.01)

(52) U.S. Cl.
CPC ..... *H04N 21/4316* (2013.01); *H04N 21/2187* (2013.01); *H04N 21/4788* (2013.01)

(58) Field of Classification Search
CPC ........... H04N 21/4316; H04N 21/2187; H04N 21/4788; H04N 21/4882; H04N 21/431;
(Continued)

(56) References Cited

U.S. PATENT DOCUMENTS

2009/0063995 A1 3/2009 Baron et al.
2009/0322786 A1 12/2009 Finger et al.
(Continued)

FOREIGN PATENT DOCUMENTS

CN 106060662 A 10/2016
CN 106454387 A 2/2017
(Continued)

OTHER PUBLICATIONS

International Search Report received for PCT Patent Application No. PCT/CN23/091234, mailed on Jun. 8, 2023, 5 pages (2 pages of English Translation and 3 pages of Original Document).
(Continued)

*Primary Examiner* — Alazar Tilahun

(57) ABSTRACT

The present disclosure relates to the technical field of computer, and in particular, an information interaction method, device, electronic apparatus and storage medium. According to an embodiment of the present disclosure, there is provided an information interaction method, including: displaying a virtual reality space, the virtual reality space including a video image display space and a target message display space; displaying a video image in the video image display space; determining a target message and displaying the target message in the target message display space; wherein the target message display space is located in front of the video image display space in a first direction, the first direction being a direction toward which the video image faces.

21 Claims, 7 Drawing Sheets

(58) Field of Classification Search
CPC ......... H04N 21/475; G06F 3/01; G06F 3/011; G02B 27/01
See application file for complete search history.

(56) References Cited

U.S. PATENT DOCUMENTS

| | | | |
|---|---|---|---|
| 2011/0164163 | A1 | 7/2011 | Bilbrey et al. |
| 2013/0325954 | A1 | 12/2013 | Cupala et al. |
| 2016/0086379 | A1 | 3/2016 | Sadi et al. |
| 2016/0277802 | A1* | 9/2016 | Bernstein ......... H04N 21/44213 |
| 2018/0341373 | A1 | 11/2018 | Aisemberg |
| 2018/0367483 | A1 | 12/2018 | Rodriguez et al. |
| 2019/0243445 | A1* | 8/2019 | Kuwatani ............... A63F 13/87 |
| 2019/0250699 | A1* | 8/2019 | Mulase ............... G06F 3/04842 |
| 2019/0392636 | A1 | 12/2019 | Zhou et al. |
| 2023/0232077 | A1 | 7/2023 | Huang et al. |

FOREIGN PATENT DOCUMENTS

| | | | |
|---|---|---|---|
| CN | 107484036 | A | 12/2017 |
| CN | 108989870 | A | 12/2018 |
| CN | 108989873 | A | 12/2018 |
| CN | 109246463 | A | 1/2019 |
| CN | 110784749 | A | 2/2020 |
| CN | 111586426 | A | 8/2020 |
| CN | 114257849 | A | 3/2022 |
| WO | 2022/073389 | A1 | 4/2022 |

OTHER PUBLICATIONS

International Search Report received for PCT Patent Application No. PCT/CN2023/091165, mailed on Jul. 14, 2023, 5 pages (2 pages of English Translation and 3 pages of Original Document).

Non-Final Office Action mailed on Sep. 9, 2025, for U.S. Appl. No. 18/842,677, pp. 19.

European Search Report for EP Patent Application No. 23814852.2, Issued on Mar. 12, 2026, 11 pages.

Office Action mailed Jun. 2, 2026 in U.S. Appl. No. 18/842,677 (18 pages).

* cited by examiner

INFORMATION INTERACTION METHOD, DEVICE, ELECTRONIC APPARATUS AND STORAGE MEDIUM

CROSS-REFERENCE TO RELATED APPLICATIONS

This application is based on and claims the benefit of priority from the International Patent Application No. PCT/CN2023/091234 and the Chinese patent application No. 202210612147.0 filed on May 31, 2022, titled as "Information Interaction Method, Device, Electronic Apparatus and Storage medium", which is hereby incorporated by reference in its entirety into the present application.

TECHNICAL FIELD

The present disclosure relates to the technical field of computer, and in particular, an information interaction method, device, electronic apparatus and storage medium.

BACKGROUND ART

With the development of Virtual Reality (VR), more and more virtual live broadcast platforms or applications have been developed for users to use. In a virtual live broadcast platform, a user can watch the performance of an anchor through, for example, a head-mounted display device and related accessories, and can interact with the anchor and other viewers through emoji and bullet comments.

SUMMARY

This portion of summary of the invention is provided to introduce a selection of concepts in a simplified form that are further described below in the portion of the preferred embodiments. This portion of summary is not intended to identify key features or essential features of the claimed subject matter, nor is it intended to be used to limit the scope of the claimed subject matter.

In one aspect, according to one or more embodiments of the present disclosure, there is provided an information interaction method, including:

- displaying a virtual reality space, the virtual reality space including a video image display space and a target message display space;
- displaying a video image in the video image display space;
- determining a target message and displaying the target message in the target message display space;
- wherein the target message display space is located in front of the video image display space in a first direction, the first direction being a direction toward which the video image faces.

In another aspect, according to one or more embodiments of the present disclosure, there is provided an object control method, including:

- displaying a virtual reality space, the virtual reality space including a video image display space and a target message display space;
- displaying a video image in the video image display space;
- determining a target message and displaying the target message in the target message display space;
- wherein in the target message display space, projections of at least two target messages in the first direction are not coincident with each other, the first direction being a direction toward which the video image faces.

In another aspect, according to one or more embodiments of the present disclosure, there is provided an information interaction device, including:

- a space display unit configured for displaying a virtual reality space, the virtual reality space including a video image display space and a target message display space;
- a video image display unit configured for displaying a video image in the video image display space;
- a message unit configured for determining a target message and displaying the target message in the target message display space, wherein the target message display space is located in front of the video image display space in a first direction, the first direction being a direction toward which the video image faces.

In another aspect, according to one or more embodiments of the present disclosure, there is provided an information interaction device, including:

- a space display unit configured for displaying a virtual reality space, the virtual reality space including a video image display space and a target message display space;
- a video image display unit configured for displaying a video image in the video image display space;
- a message unit configured for determining a target message and displaying the target message in the target message display space, wherein in the target message display space, projections of at least two target messages in the first direction are not coincident with each other, the first direction being a direction toward which the video image faces.

In another aspect, according to one or more embodiments of the present disclosure, there is provided an electronic apparatus including at least one memory and at least one processor, wherein the memory is configured for storing a program code, and the processor is configured for calling the program code stored in the memory to cause the electronic apparatus to execute the information interaction method provided according to one or more embodiments of the present disclosure.

In another aspect, according to one or more embodiments of the present disclosure, there is provided a non-transient computer storage medium, which stores a program code that, when executed by a computer apparatus, causes the computer apparatus to execute the information interaction method provided according to one or more embodiments of the present disclosure.

BRIEF DESCRIPTION OF THE DRAWINGS

The above and other features, advantages and aspects of embodiments of the present disclosure will become more apparent by referring to the following preferred embodiments in conjunction with the accompanying drawings. Throughout the drawings, identical or similar reference numerals denote identical or similar elements. It should be understood that the drawings are schematic, and units and elements are not necessarily drawn to scale.

DETAILED DESCRIPTION OF PREFERRED EMBODIMENTS

Figure 1:
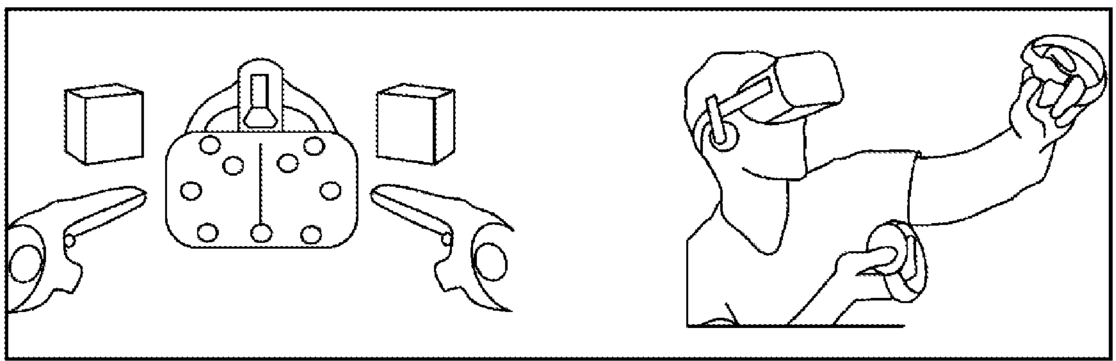
FIG. 1 is a schematic diagram of a virtual reality apparatus according to an embodiment of that present disclosure.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are used only for illustrative purposes, and are not used to limit the protection scope of the present disclosure.

It should be understood that steps described in the embodiments of the present disclosure may be executed in different sequences and/or in parallel. Further, embodiments may include additional steps and/or omit execution of illustrated steps. Scope of the present disclosure is not limited in this respect.

As used herein, the term "including" and its variants are open-ended including, that is, "including but not limited to". The term "based on" is "at least partially based on". The term "one embodiment" means "at least one embodiment"; the term "another embodiment" means "at least one other embodiment"; the term "some embodiments" means "at least some embodiments". The term "in response to" and related terms mean that one signal or event is affected to some extent by another signal or event, but not necessarily completely or directly. If the event X occurs "in response" to the event Y, X can directly or indirectly respond to Y. For example, the appearance of Y may eventually lead to the appearance of X, but there may be other intermediate events and/or conditions. In other cases, Y may not necessarily lead to the appearance of X, and X may occur even if Y has not yet occurred. Furthermore, the term "in response to" can also mean "at least partially in response to".

The term "determining" covers a wide range of actions, which may include acquiring, computing, calculating, processing, deriving, investigating, looking up (for example, looking up in a table, database or other data structure), ascertaining, and the like, and may also include receiving (for example, receiving information), accessing (for example, accessing data in a memory) and the like, as well as parsing, selecting, choosing, creating and the like. Related definitions of other terms will be given in the below description. Related definitions of other terms will be given in the below description.

It should be noted that such concepts as "first", "second" etc. mentioned in the present disclosure are only used to distinguish different devices, modules or units, and are not used to limit the order or interdependence of functions performed by these devices, modules or units.

It should be noted that such modifiers as "a" and "a plurality" mentioned in this disclosure are schematic rather than limiting, and those skilled in the art should understand that unless the context clearly indicates otherwise, they should be understood as "one or more".

For the purpose of this disclosure, the phrase "A and/or B" means (A), (B) or (A and B).

Names of messages or information exchanged among multiple devices in the embodiments of the present disclosure are only used for illustrative purposes, and are not used to limit the scope of these messages or information.

The information interaction method provided by one or more embodiments of the present disclosure adopts Extended Reality (XR for short) technology. Extended reality technology can combine reality and virtuality through computers, and provide users with a virtual reality space for human-computer interaction. In the virtual reality space, users can interact socially, entertain, study, work, telecommute, create UGC (User Generated Content) and so on through virtual reality apparatuses such as a Head Mount Display (HMD) and the like.

The virtual reality apparatuses recited in the embodiments of the present disclosure may include but are not limited to the following types:

PC-side virtual reality (PCVR) equipment which uses the PC-side to perform the related calculation and data output of the virtual reality function, and external PC-side virtual reality equipment which uses the data output from the PC-side to realize the virtual reality effect;

Mobile virtual reality equipment which supports setting up mobile terminals (such as smart phones) in various ways (such as head-mounted displays with special card slots), wherein through wired or wireless connection with the mobile terminals, the mobile terminals can perform relevant calculations of virtual reality functions and output data to the mobile virtual reality equipment, such as watching virtual reality videos through the mobile terminal's APP; and All-in-one virtual reality equipment which is provided with a processor for the relevant calculation of virtual functions, so that it has independent virtual reality input and output functions, and does not need to be connected with PC or mobile terminals, so that it has high freedom of use.

Of course, the form of virtual reality apparatus is not limited to this, and it can be further miniaturized or enlarged as needed.

A sensor for attitude detection (such as a nine-axis sensor) is provided in the virtual reality apparatus, which is configured for detecting attitude change of the virtual reality apparatus in real time. If the user wears a virtual reality apparatus, when the posture of the user's head changes, the real-time posture of the user's head will be transmitted to the processor, so as to calculate the gaze point of the user's line of sight in the virtual environment. According to the gaze point, the image in the three-dimensional model of the virtual environment that is in the user's gaze range (that is, the virtual field of view) will be calculated and displayed on the display screen, making people feel as if they are watching in the real environment.

Figure 2:
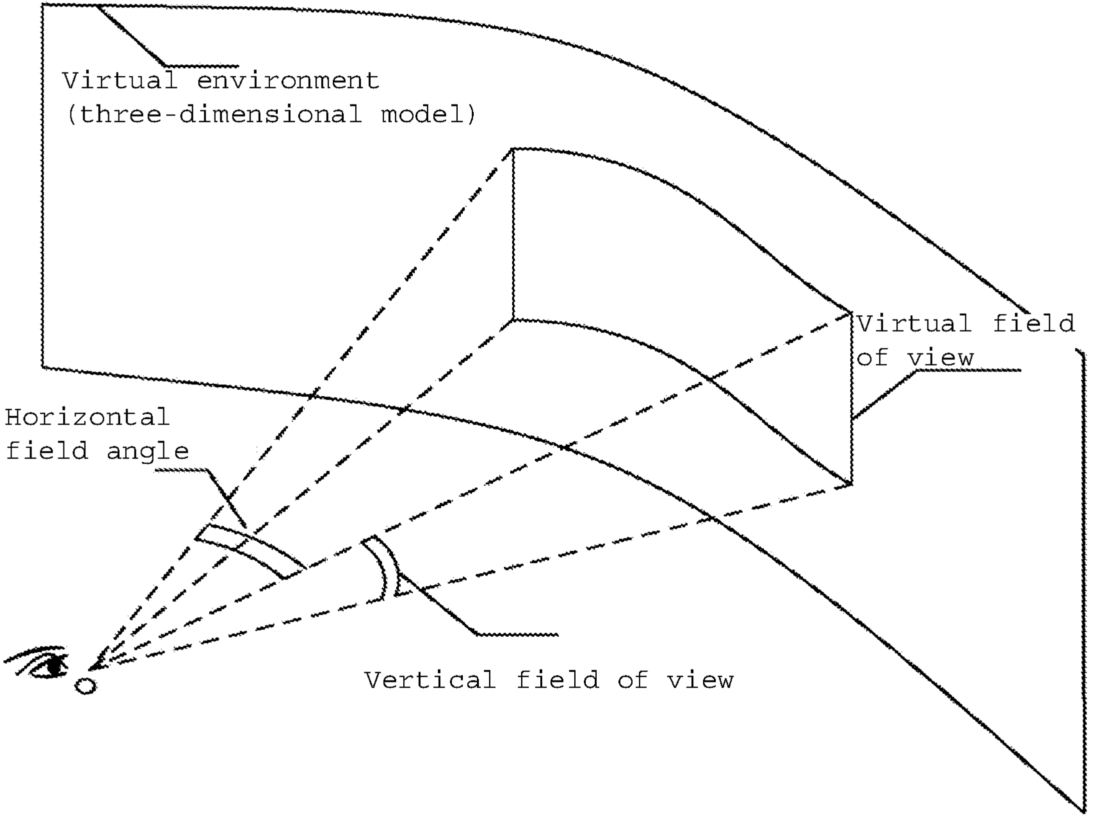
FIG. 2 is an optional schematic diagram of a virtual field of view of a virtual reality apparatus provided according to an embodiment of the present disclosure.

FIG. 2 shows an optional schematic diagram of the virtual field of view of the virtual reality apparatus provided by an embodiment of the present disclosure. The horizontal and vertical field of view angles are used to describe the distribution range of the virtual field of view in the virtual environment, the vertical distribution range is represented by the vertical field of view angle BOC, and the horizontal distribution range is represented by the horizontal field of view angle AOB. The human eye can always perceive the image located in the virtual field of view in the virtual environment through the lens. It can be understood that the larger the angle of view, the larger the size of the virtual field of view and the larger the area of the virtual environment that the user can perceive. Wherein the viewing angle represents the distribution range of viewing angles when the environment is perceived through the lens. For example, the visual angle of a virtual reality apparatus indicates the distribution range of the visual angle of human eyes when they perceive the virtual environment through the lens of the virtual reality apparatus; for another example, for a mobile terminal equipped with a camera, the visual angle of the camera is the distribution range of the visual angle when the camera perceives the real environment to shoot.

Virtual reality apparatus, such as HMD, integrates several cameras (such as depth camera, RGB camera, etc.), and the purpose of cameras is not limited to providing through views. Camera images and integrated inertial measurement unit (IMU) provide data that can be processed by computer vision methods to automatically analyze and understand the environment. Also, HMD is designed to support not only passive computer vision analysis, but also active computer vision analysis. Passive computer vision method analyzes the image information captured from the environment. These methods can be monocular (images from a single camera) or stereoscopic (images from two cameras). They include, but are not limited to, feature tracking, object recognition and depth estimation. Active computer vision method adds information to the environment by projecting patterns that are visible to the camera but not necessarily to the human visual system. Such technologies include time-of-flight (ToF) cameras, laser scanning or structured light to simplify the stereo matching problem. Active computer vision is used to realize scene depth reconstruction.

Figure 3:
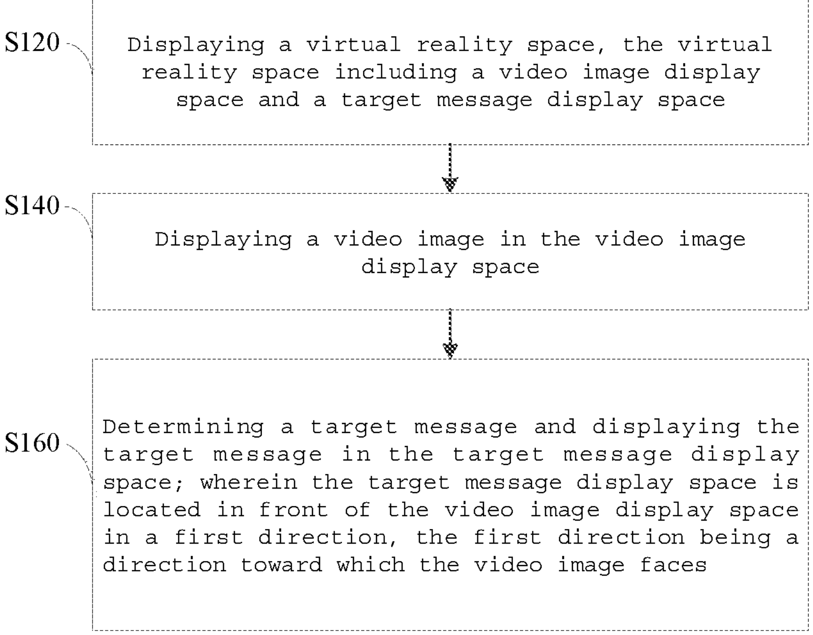
FIG. 3 is a flowchart of an information interaction method provided by an embodiment of the present disclosure.

Referring to FIG. 3, which shows a flowchart of an information interaction method 100 provided by an embodiment of the present disclosure, the method 100 includes steps S120-S160.

Step S120: displaying a virtual reality space, the virtual reality space including a video image display space and a target message display space.

Wherein the virtual reality space can be a simulation environment for the real world, a semi-simulated and semi-fictional virtual scene, or a purely fictional virtual scene. The virtual scene can be any one of a two-dimensional virtual scene, a 2.5-dimensional virtual scene or a three-dimensional virtual scene, and the dimensions of the virtual scene are not limited in embodiments of the present application. For example, the virtual scene can include sky, land, ocean, etc. The land can include environmental elements such as desert, city and the like, and users can control virtual objects to move in the virtual scene.

Referring to FIG. 1, a user can enter a virtual reality space through intelligent terminal apparatuses such as head-mounted VR glasses, and control his Avatar to have social interaction, entertainment, study, telecommuting, etc. with other user-controlled avatars in the virtual reality space.

In one embodiment, in the virtual reality space, the user can implement the related interactive operation through the controller, which can be a handle, for example, the user controls the related operation by operating the keys of the handle. Of course, in another embodiment, the target object in the virtual reality apparatus can be controlled by gestures, voice or multimodal control without using a controller.

In some embodiments, the virtual reality space includes a virtual live broadcast space. In the virtual live broadcast space, performer users can broadcast live with virtual images or real images, and audience users can control virtual characters to watch the live broadcast of performers from a viewing angle such as the first person perspective.

Step S140: displaying a video image in the video image display space.

In some embodiments, a video stream can be obtained and video content can be presented in a video image display space based on the video stream. For example, the video stream may adopt encoding formats such as H.265, H. 264, MPEG-4, etc. In a specific embodiment, the client can receive a live video stream sent by the server and display the live video image in the video image display space based on the live video stream.

In some embodiments, the video image display space displays 3D (stereoscopic) video by default. 3D video technology uses human eyes, including but not limited to rectangular 3D video, semi-panoramic 3D video, panoramic 3D video or fisheye 3D video.

Step S160: determining a target message and displaying the target message in the target message display space, wherein the target message display space is located in front of the video image display space in a first direction, the first direction being a direction toward which the video image faces.

In some embodiments, the target message includes, but is not limited to, text message (e.g., comments, bullet comments) and image message (e.g., emoji, picture, virtual item, etc.).

In a specific embodiment, the current user can call up the message editing interface through a preset operation, edit and send the target message, and display the target message sent by the current user in the target message display space. In another embodiment, the client can accept target messages sent by the server from other clients and display the target messages from other clients in the target message display space.

Figure 4:
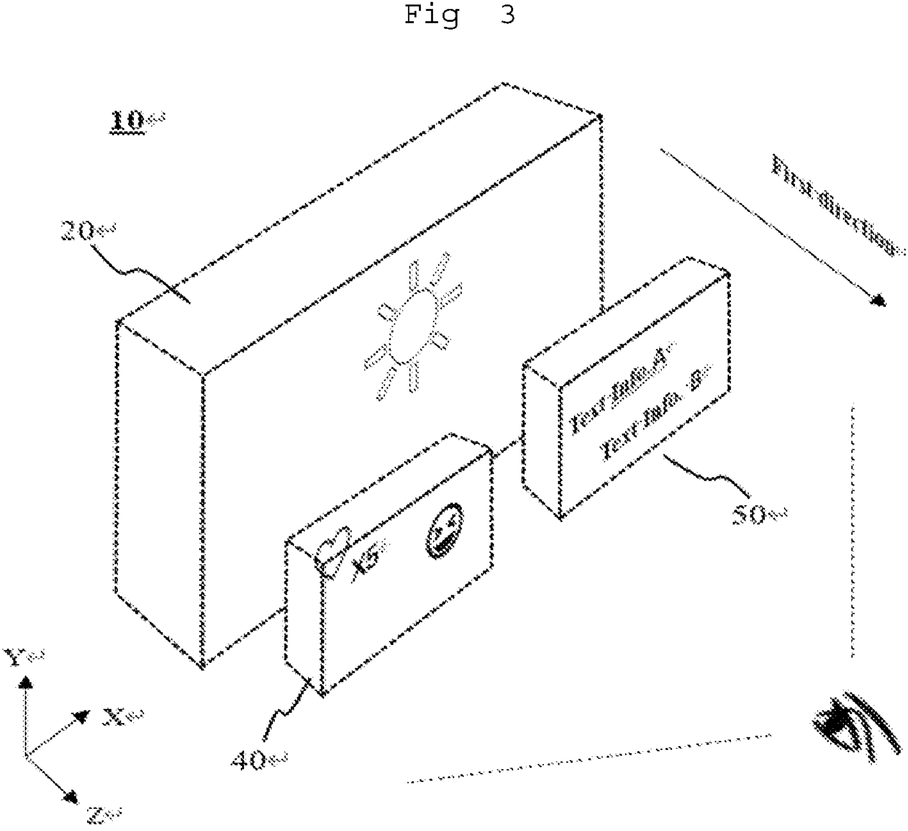
FIG. 4 is a schematic diagram of a virtual reality space provided according to an embodiment of the present disclosure.

Referring to FIG. 4, which is a schematic diagram of a virtual reality space provided according to an embodiment of the present disclosure; The virtual reality space 10 includes a video image display space 20 and target message display spaces 40 and 50. The video image display space 20 can be configured to display video images, such as 3D video images. The target message display spaces 40 and 50 can be configured to display image messages (such as emoji, pictures, virtual objects, etc.) and text messages (such as comments or bullet comments sent by the current user or other users), respectively. The target message display spaces 40, 50 are located in front of the video image display space in a first direction (that is, the direction of the Z axis shown in FIG. 4), where the first direction is a direction toward which the video image faces, that is, the direction opposite to the viewing direction when the user watches the front video image. In this embodiment, the user viewing distance corresponding to the target message display space is closer than the viewing distance corresponding to the video image display space, thus presenting a visual effect that the target message is closer and the video image is farther away.

According to one or more embodiments of the present disclosure, the target message display space is located in front of the video image display space in the direction of the video image in the virtual reality space, so that the viewing distance of the user corresponding to the target message display space is closer than that corresponding to the video image display space, thereby enabling the target message to be independent of the video image, enhancing the spatial layering of viewing, solving the problem of virtual shadow when the target message coexists with the 3D video image, and avoiding the focusing difficulty of the user.

In some embodiments, in the target message display space, projections of at least two target messages in the first direction are not coincident with each other. For example, referring to FIG. 4, in the first direction, the text message B in the target message space 50 is located before the text message A, and their projections in the first direction are not coincident with each other; similarly, the smiley face emoji in the target message space 40 is displayed before the love emoji, and their projections in the first direction are also not coincident with each other. As so, different target messages in the target message space can correspond to different user viewing distances, thus realizing that the target messages have different display depths.

In some embodiments, in the front view of the target message display space, the at least two target messages are arranged along a preset first path; in the left view of the target message display space, the at least two target messages are arranged along a preset second path; wherein the front view of the target message display space is a view that can show the front content of the target message. As so, when the user is facing the target message (that is, the display content of the target message can be observed), the target message is arranged along the preset first path in the user's perspective, and when the user faces the target message (that is, only the left projection of the target message can be observed), the target message is arranged along the preset second path in the user's perspective.

In some embodiments, the first path and the second path are both arc paths.

Figure 5A:
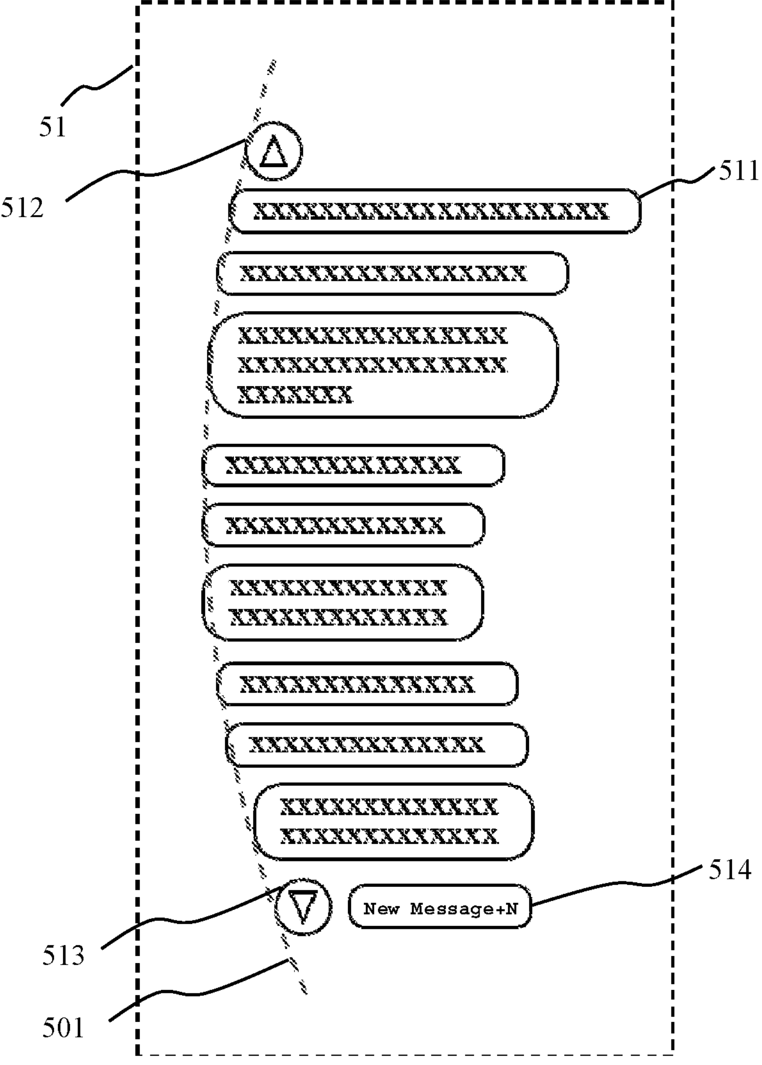
FIGS. 5*a* and 5*b* are a front view and a left view, respectively, of a target message display space provided according to an embodiment of the present disclosure.
Figure 5B:
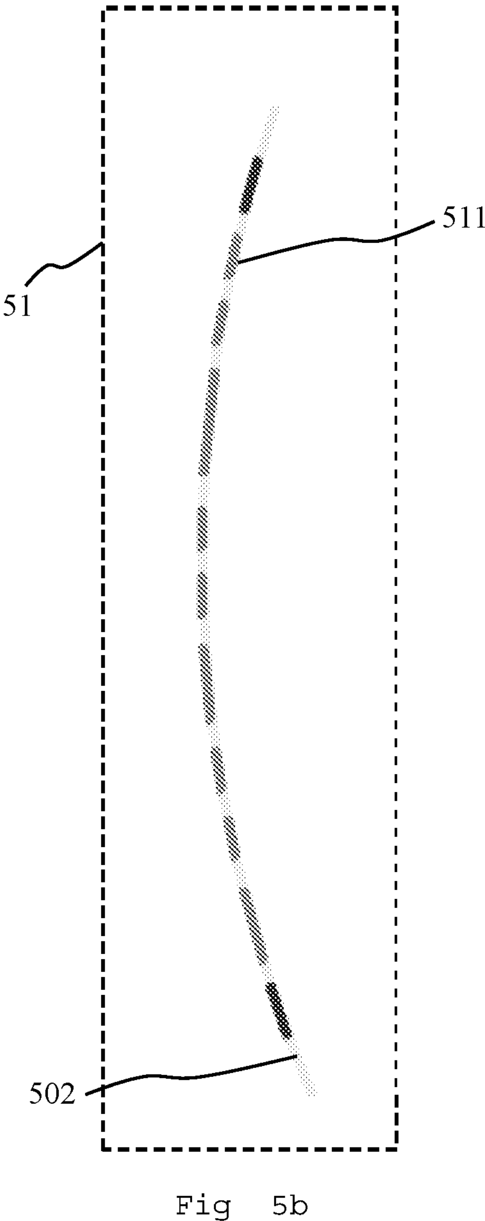

FIGS. 5*a* and 5*b* are a front view and a left view, respectively, of a target message display space provided according to an embodiment of the present disclosure. Referring to FIG. 5*a*, in the front view of the target message display space 51, a plurality of target messages 511 are arranged along an arc-shaped first path 501; referring to FIG. 5*b*, in the left view of the target message display space, a plurality of target messages 511 are arranged along an arc-shaped second path 502.

According to one or more embodiments of the present disclosure, the target message is distributed in an arc shape in both the front view and the left view, so that the message content can be better integrated with the video image display space from the user's viewing angle, and the interactive experience of the user can be improved.

In some embodiments, the information interaction method further includes rotating the target message around a preset longitudinal axis based on a viewing angle of a user, so that content of the target message is visible to the user. For example, referring to FIG. 4, when the user changes the viewing angle, for example, when the user controls an Avatar or other counterpart to move in the virtual space, the target message can be correspondingly rotated around a y-axis, so as to allow the content of the target message to be visible to the user.

In some embodiments, referring to FIG. 5*a*, the target message display space may display a message queue including a plurality of target messages in the form of up-down information flow, and the newly loaded target message appears at the bottom of the message queue.

In some embodiments, in response to an operation on the target message display space, a preset first prompt identification is displayed; the first prompt identification is configured to indicate a display direction of the target message, and the target message display space is configured to dynamically display historical target messages along the display direction of the target message.

In some embodiments, the method 100 further includes:

Step A1: in response to an operation on the target message display space, displaying a preset first prompt identification, wherein the first prompt identification is configured to indicate a target message display direction that is available at present, and the target message display space is configured to dynamically display historical target messages along the target message display direction.

Operation for the target message display space includes, but is not limited to, somatosensory control operation, gesture control operation, eye shaking operation, touch control operation, voice control instruction, or preset operation of external control equipment. For example, the user can point the ray at the target message display space through the handle to call the preset first prompt identification. The first prompt identification can display a target message display direction, and the user can control the handle according to the displayed target message direction, so that the target message display space can scroll up and down or turn pages to display the target message.

In some embodiments, the method 100 further includes:

Step A2: when the target message display space dynamically displays the target message along the target message display direction, displaying a preset second prompt identification in response to receiving a new target message;

Step A3: in response to the second prompt identification being triggered, displaying the new target message in the target message display space.

In some embodiments, the second prompt identification displays the number of the new target messages.

Referring to FIG. 5*a*, after the user triggers the target message display space 51 through, for example, a handle ray or another preset operation, first prompt identifications 512, 513 can be displayed at preset positions of the target message display space 51, for example, above and below the target message queue presented in the target message display space, wherein the first prompt identification 512 is configured to indicate that the target message can be scrolled up or turned pages, and the first prompt mark 513 is configured to indicate that the target message can be scrolled down or turned pages, so that the user can control the target message display space to scroll up or down or turn pages according to the target message display direction indicated by the first prompt identification. If the virtual reality apparatus receives n new target messages during the scrolling or page turning of the target message display space, a second prompt identification 514 "new message +N" can be displayed at a preset position of the target message display space 51, for example, below the target message queue presented in the target message display space, so as to prompt the user that n new messages are currently received. If the user triggers the second prompt identification through a preset operation, the target message display space jumps to display a new message.

In some embodiments, if the first prompt identification is highlighted, it means that the display target message display direction indicated by the first prompt identification is available; if the first prompt identification is highlighted in gray scale, it means that the display target message display direction indicated by the first prompt identification is unavailable.

In some embodiments, an orthographic projection of the target message display space on the video image display space is located outside the preset central area of the video image display space.

Figure 6A:
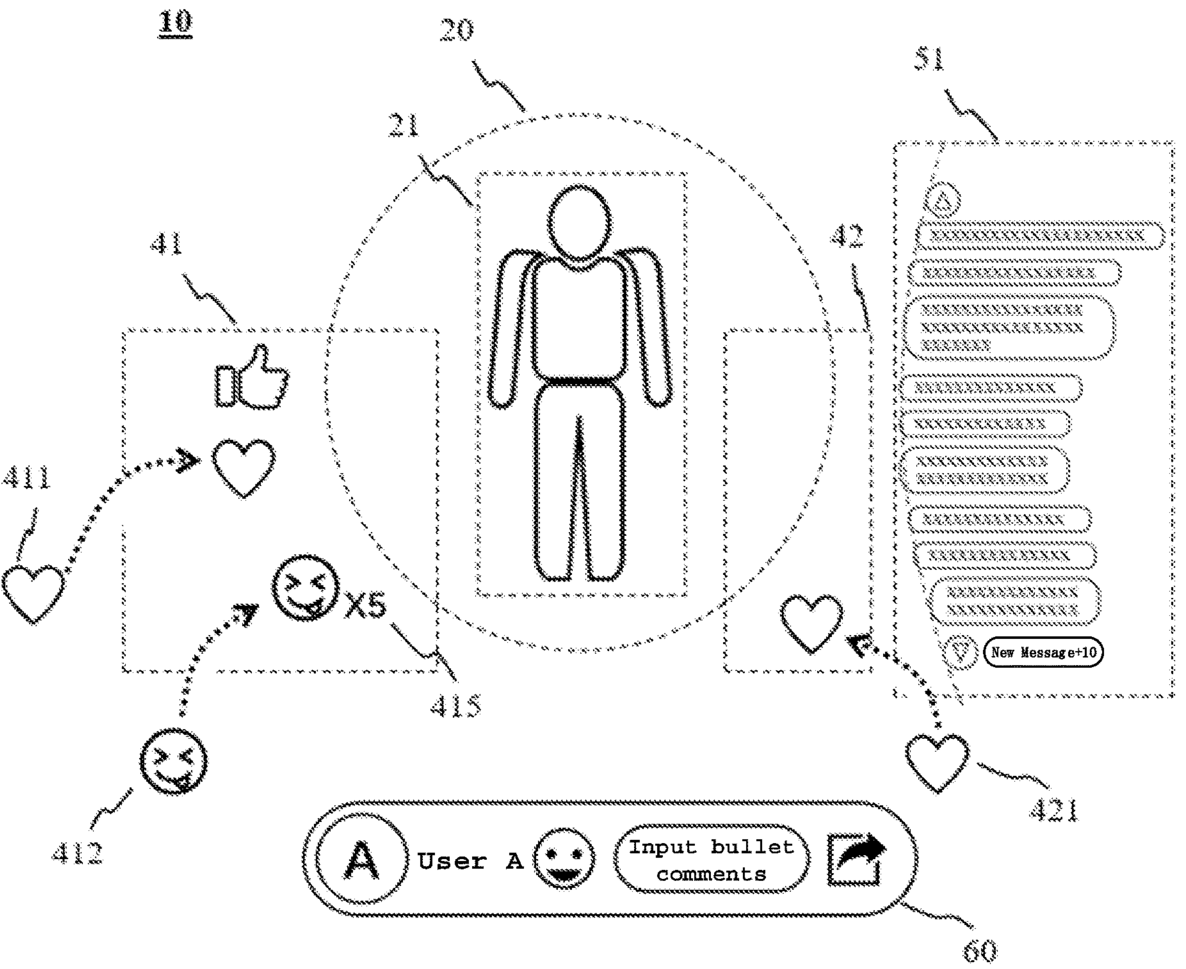
FIGS. 6*a* and 6*b* are schematic diagrams of a virtual reality space provided according to an embodiment of the present disclosure.

FIG. 6*a* is a schematic diagram of a virtual reality space provided according to an embodiment of the present disclosure, which reflects the virtual reality space presented in the user's perspective when the user looks at a video image from the front. Referring to FIG. 6*a*, the virtual reality space 10 includes a video image display space 20 and target message display spaces 41, 42 and 51. Wherein the orthographic projections of the target message display spaces 41, 42 and 51 on the video image display space 20 are all located outside the preset central area 21, so that the target message display spaces 41, 42 and 51 do not block the preset central area, thus not affecting the user's video viewing experience.

It should be noted that a person skilled in the art can set position and size of the preset central area according to actual needs with the above teaching of the present disclosure, which is not limited here in the present disclosure.

In one embodiment, as shown in FIG. 6*a*, the target message display spaces 41, 42 may be display spaces for displaying image messages, and the target message display space 51 may be a display space for displaying text messages. The target message display spaces 41, 42 and 51 can rotate the target message around a preset longitudinal axis based on a viewing angle of a user, so that content of the target message can be visible to the user.

Figure 6B:
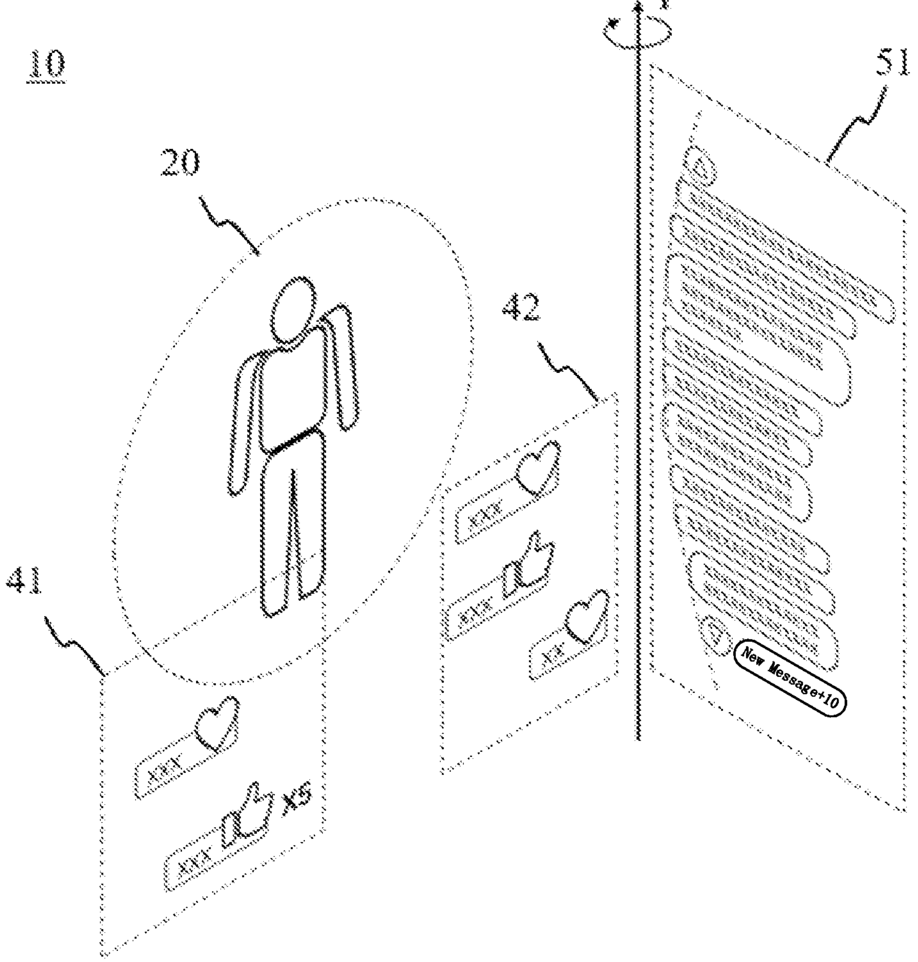

In one embodiment, as shown in FIG. 6*b*, positions of the target message display spaces 41, 42 can be unchanged relative to the video image display space 20, and the target message space 51 can be deflected around the Y axis according to the user's visual angle when the user's visual angle rotates.

In some embodiments, step S160 further includes:

Step B1: moving the target message towards inside of the target message display space.

Referring to FIG. 6*a*, the target message display spaces 41 and 42 for displaying image information (such as emoji or virtual objects) are located on the left and right sides of the preset central area 21, showing the visual effect that the target message "tightly surrounds" the performer. The determined target messages 411, 412 and 421 (such as those sent by the current user or other users) can "fly" into the target message display space, presenting a visual effect of cheering or presenting gifts to the performers, thus enriching the user's interactive experience and enhancing the user's sense of participation.

In some embodiments, if the target message is originated from a current client, the target message moves along a first path; if the target message is originated from a client other than the current client, the target message moves along a second path.

In some embodiments, the second path may be a random path other than the first path. For example, a plurality of moving paths can be preset, so that one is randomly selected as the second path each time.

In this embodiment, target messages from different sources have different moving paths, so that it is convenient for users to distinguish which target messages are sent by themselves, and thus the interactive experience of users can be improved.

In some embodiments, the first path is a path between a message editing interface and the target message display space; the message editing interface is configured for editing and sending target messages.

In some embodiments, the target message sent by the current client can be highlighted. For example, the target message sent by the current client can be highlighted by the background color, the size of the target message or another sign, animation special effect, etc.

In some embodiment, if two or more identical first target messages from the same client are determined within a preset time period, moving paths of the two or more identical first target messages are the same. For example, after the first target message A moves to the target message space, it can stay in the target message space and be presented for 2 seconds. During this period, if the same client sends the same first target message A, the same first target message A will move to the target message space along the same moving path, so that the visual effect of "continuous delivery" can be presented.

In some embodiments, a third identification corresponding to the two or more identical first target messages is displayed in the target message display space, and the third identification is configured to display the number of the first target messages currently arrived in the target message display space. For example, after the first target message A moves to the target message space, it can stay in the target message space A and be presented for 2 seconds. During this period, if the same client sends the same first target message A, then when a new first target message A arrives in the target message display space, an identification "X2" can be displayed, which is configured to display the number of first target messages A that have continuously arrived in the target message space at present in real time. Referring to FIG. 6*a*, a third identification 415 displays "x5", indicating that the same client has sent five target messages 412 continuously at present. When the same client sends a new target message B, the target message B can move through a new path.

Referring to FIG. 6*a*, the virtual reality space 10 currently displays a message editing interface 60, and the current user A can input emoji or bullet comments to the message editing interface 60, or trigger another function menus.

In some embodiments, when the message editing interface is called by a preset operation, the video image displayed in the video image display space can be switched from 3D format to 2D format, so as to ensure that the user can better focus on the message editing interface to edit the target message when using the message editing interface (such as editing the target message).

Further, in some embodiments, when the message editing interface is hidden by the preset operation, the video image displayed in the video image display space can be switched from 2D format to 3D format.

Figure 7:
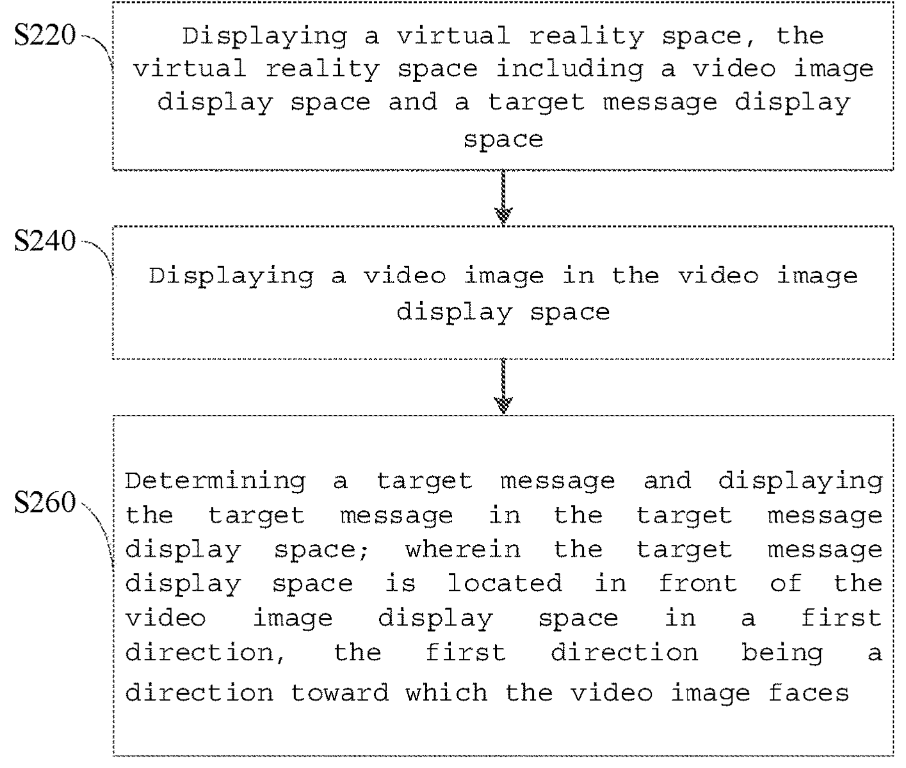
FIG. 7 is a flowchart of an information interaction method provided by another embodiment of the present disclosure.

Referring to FIG. 7, which shows a flowchart of an information interaction method 100 provided by an embodiment of the present disclosure, the method 200 includes steps S220-S260.

Step S220: displaying a virtual reality space, the virtual reality space including a video image display space and a target message display space;

Step S240: displaying a video image in the video image display space;

Step S260: determining a target message and displaying the target message in the target message display space, wherein in the target message display space, projections of at least two target messages in the first direction are not coincident with each other, the first direction being a direction toward which the video image faces.

In some embodiments, in the front view of the target message display space, the at least two target messages are arranged along a preset first path; in the left view of the target message display space, the at least two target messages are arranged along a preset second path; wherein the front view of the target message display space is a view that can show the front content of the target message.

In some embodiments, the method 200 further includes:

in response to an operation on the target message display space, displaying a preset first prompt identification, wherein the first prompt identification is configured to indicate a target message display direction, and the target message display space is configured to dynamically display historical target messages along the target message display direction.

In some embodiments, the method 200 further includes:

Step C1: when the target message display space dynamically displays the target message along the target message display direction, displaying a preset second prompt identification in a preset position of the target message display space in response to receiving a new target message;

Step C2: in response to the second prompt identification being triggered, displaying the new target message in the target message display space.

Correspondingly, according to one embodiment of the present disclosure, there is provided an information interaction device, including:

a space display unit configured for displaying a virtual reality space, the virtual reality space including a video image display space and a target message display space;

a video image display unit configured for displaying a video image in the video image display space;

a message unit configured for determining a target message and displaying the target message in the target message display space, wherein the target message display space is located in front of the video image display space in a first direction, the first direction being a direction toward which the video image faces.

Correspondingly, according to one embodiment of the present disclosure, there is provided an information interaction device, including:

an information display device, characterized in including:

a space display unit configured for displaying a virtual reality space, the virtual reality space including a video image display space and a target message display space;

a video image display unit configured for displaying a video image in the video image display space;

a message unit configured for determining a target message and displaying the target message in the target message display space, wherein in the target message display space, projections of at least two target messages in the first direction are not coincident with each other, the first direction being a direction toward which the video image faces.

In some embodiments, the target message display space includes: at least one display space for displaying text messages and/or at least one display space for displaying image messages.

In some embodiments, an orthographic projection of the target message display space on the video image display space is located outside a preset central area of the video image display space.

In some embodiments, said that an orthographic projection of the target message display space on the video image display space is located outside a preset central area of the video image display space, includes: the orthographic projection is located on a left and/or right side of the preset central area of the video image display area.

In some embodiments, in the target message display space, projections of at least two target messages in the first direction are not coincident with each other.

In some embodiments, in a front view of the target message display space, at least two target messages are arranged along a preset first path; in a left view of the target message display space, at least two target messages are arranged along a preset second path; wherein the front view of the target message display space is a view that can show front content of the target message.

In some embodiments, the information interaction device further includes:

a message rotating unit configured to rotate the target message around a preset longitudinal axis based on a viewing angle of a user, so that content of the target message can be visible to the user.

In some embodiments, the information interaction device further includes:

a first prompt unit configured for, in response to an operation on the target message display space, displaying a first prompt identification, wherein the first prompt identification is configured to indicate a target message display direction that is available at present, and the target message display space is configured to dynamically display the target message along the target message display direction.

In some embodiments, the information interaction device further includes:

a second prompt unit configured for, when the target message display space dynamically displays the target message along the target message display direction, displaying a second prompt identification in response to receiving a new target message; in response to the second prompt identification being triggered, displaying the new target message in the target message display space.

In some embodiments, the second prompt identification displays the number of the new target messages.

In some embodiments, the displaying the target message in the target message display space includes: moving the target message toward inside of the target message display space.

In some embodiments, if the target message is originated from a current client, the target message moves along a first path; if the target message is originated from a client other than the current client, the target message moves along a second path.

In some embodiments, the first path is a path between a message editing interface and the target message display space; the message editing interface is configured for editing and sending target messages.

In some embodiment, if two or more identical first target messages from the same client are determined within a preset time period, moving paths of the two or more identical first target messages are the same.

In some embodiments, the information interaction device further includes:

a third prompt unit configured to display a third identification corresponding to the two or more identical first target messages in the target message display space, and the third identification is configured to display the number of the first target messages currently arrived in the target message display space.

For the device embodiments, since they basically corresponds to the method embodiments, for relevant points thereof, one may refer to partial description of the method embodiments. The device embodiments described above are only schematic, wherein the modules described as separate modules may or may not be separate. Some or all of the modules can be selected according to actual needs to achieve the purpose of the solution of this embodiment. A person skilled in the art can understand and implement it without any creative effort.

Correspondingly, according to one or more embodiments of the present disclosure, there is provided an electronic apparatus, including:

at least one memory and at least one processor;

wherein the memory is configured for storing a program code, and the processor is configured for calling the program code stored in the memory to cause the electronic apparatus to execute the information interaction method provided according to one or more embodiments of the present disclosure.

Correspondingly, according to one or more embodiments of the present disclosure, there is provided a non-transient computer storage medium, which stores a program code that, when executed by a computer apparatus, causes the computer apparatus to execute the information interaction method provided according to one or more embodiments of the present disclosure.

Figure 8:
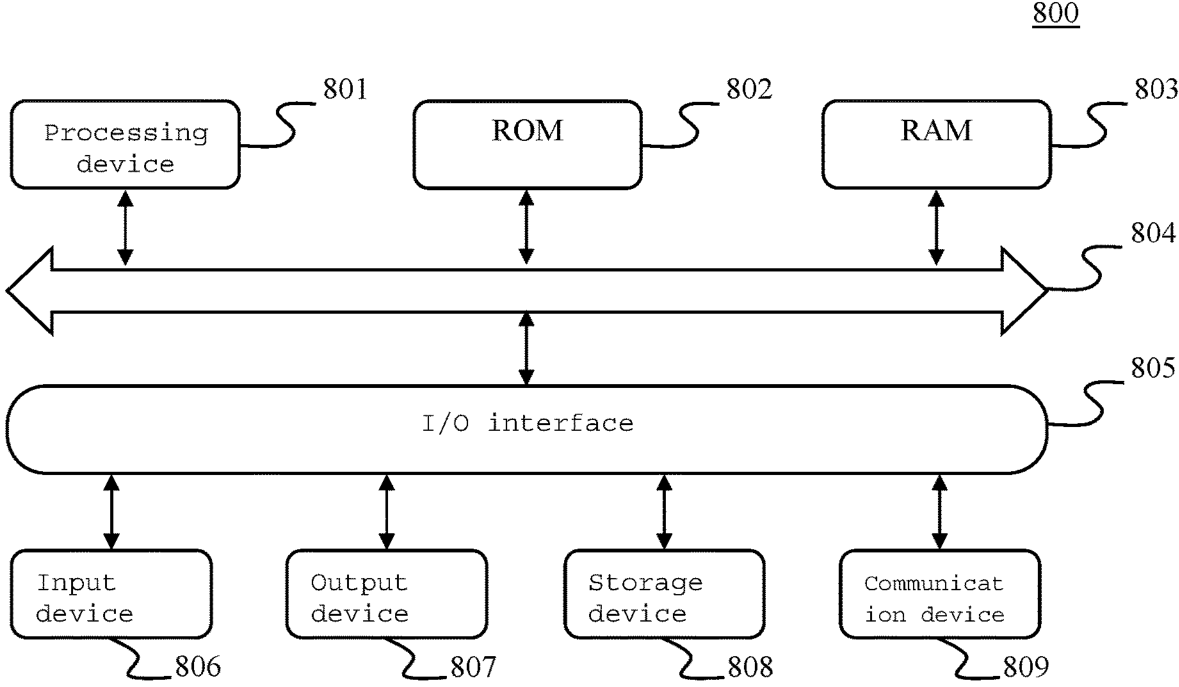
FIG. 8 is a structural schematic diagram of an electronic apparatus provided by an embodiment of the present disclosure.

Referring now to FIG. 8, there is shown a structural schematic diagram of an electronic apparatus (terminal equipment 800 adapted for implementing an embodiment of the or server) present disclosure. The terminal equipment in the embodiment of the present disclosure may include, but is not limited to, a mobile terminal such as a mobile phone, a notebook computer, a digital broadcast receiver, a PDA (Personal Digital Assistant), a PAD (Tablet Computer), a PMP (Portable Multimedia Player), a vehicle-mounted terminal (such as a vehicle-mounted navigation terminal) and the like, and a fixed terminal such as a digital TV, a desktop computer and the like. The electronic apparatus shown in FIG. 8 is only an example, and should not be construed to limit function and application scope of the embodiment of the present disclosure.

As shown in FIG. 8, an electronic apparatus 800 may include a processing device (e.g., a central processor, a graphics processor, etc.) 801, which may perform various appropriate actions and processes according to a program stored in a read-only memory (ROM) 802 or a program loaded into a random access memory (RAM) 803 from a storage device 808. In the RAM 803, various programs and data required for operation of the electronic apparatus 800 are also stored. The processing device 801, the ROM 802 and the RAM 803 are connected to each other through a bus 804. An input/output (I/O) interface 805 is also connected to the bus 804.

Generally, the following devices can be connected to the I/O interface 805: an input device 806 including, for example, a touch screen, a touch pad, a keyboard, a mouse, a camera, a microphone, an accelerometer, a gyroscope, etc.; an output device 807 including, for example, a liquid crystal display (LCD), a speaker, a vibrator, etc.; a storage device 808 including, for example, a magnetic tape, a hard disk, etc.; and a communication device 809. The communication device 809 may allow the electronic apparatus 800 to communicate wirelessly or wiredly with other devices to exchange data. Although FIG. 8 shows an electronic apparatus 800 with various devices, it should be understood that it is not required to implement or have all the devices shown. More or fewer devices may alternatively be implemented or provided.

In particular, according to an embodiment of the present disclosure, the process described above with reference to the flowchart can be implemented as a computer software program. For example, the embodiment of the present disclosure includes a computer program product including a computer program carried on a computer-readable medium, the computer program including a program code for executing the method shown in the flowchart. In such an embodiment, the computer program can be downloaded and installed from the network through the communication device 809, or installed from the storage device 808, or installed from the ROM 802. When the computer program is executed by the processing device 801, the above function defined in the method of the embodiment of the present disclosure is performed.

It should be noted that the computer-readable medium mentioned above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device or unit, or any combination of the above. More examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which program can be used by or in combination with an instruction execution system, device or unit. In the present disclosure, a computer-readable signal medium may include a data signal propagated in baseband or as part of a carrier wave, in which computer-readable program code is carried. This propagated data signal can take many forms, including but not limited to an electromagnetic signal, an optical signal or any suitable combination of the above. A computer-readable signal medium can also be any computer-readable medium other than a computer-readable storage medium, which can send, propagate or transmit a program for use by or in connection with an instruction execution system, device or unit. Program code contained in the computer-readable medium can be transmitted by any suitable medium, including but not limited to: a wire, an optical cable, a RF (radio frequency) and the like, or any suitable combination of the above.

In some embodiments, the client and the server can communicate by using any currently known or future developed network protocol such as HTTP (HyperText Transfer Protocol), and can be interconnected with digital data communication in any form or medium (for example, communication network). Examples of communication network include a local area network ("LAN"), a wide area network ("WAN"), an internet (for example, the Internet) and an end-to-end network (for example, ad hoc end-to-end network), as well as any currently known or future developed network.

The computer-readable medium may be included in the electronic device; or it can exist independently without being assembled into the electronic device.

The computer-readable medium carries one or more programs, which, when executed by the electronic apparatus, cause the electronic apparatus to perform the method of the present disclosure.

Computer program code for performing operations of the present disclosure may be written in one or more programming languages or their combinations, including object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or part of codes that contains one or more executable instructions for implementing a specified logical function. It should also be noted that in some alternative implementations, the function noted in the block may occur in a different order than that noted in the drawing. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

Units involved in the embodiment described in the present disclosure can be realized by software or hardware. Wherein names of units do not constitute limitation of the units themselves in some cases.

Functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, device or apparatus. The machine-readable medium may be a machine-readable signal medium or a machine-readable storage medium. A machine-readable medium may include, but is not limited to, an electronic, magnetic, optical, electromagnetic, infrared, or semiconductor system, device or apparatus, or any suitable combination of the above. More specific examples of the machine-readable storage medium may include an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage apparatus, a magnetic storage apparatus, or any suitable combination of the above.

According to one or more embodiments of the present disclosure, there is provided an information interaction method, including: displaying a virtual reality space, the virtual reality space including a video image display space and a target message display space; displaying a video image in the video image display space; determining a target message and displaying the target message in the target message display space; wherein the target message display space is located in front of the video image display space in a first direction, the first direction being a direction toward which the video image faces.

According to one or more embodiments of the present disclosure, the target message display space includes: at least one display space for displaying text messages and/or at least one display space for displaying image messages.

According to one or more embodiments of the present disclosure, an orthographic projection of the target message display space on the video image display space is located outside a preset central area of the video image display space.

According to one or more embodiments of the present disclosure, said that an orthographic projection of the target message display space on the video image display space is located outside a preset central area of the video image display space, includes: the orthographic projection is located on a left and/or right side of the preset central area of the video image display area.

According to one or more embodiments of the present disclosure, in the target message display space, projections of at least two target messages in the first direction are not coincident with each other.

According to one or more embodiments of the present disclosure, in a front view of the target message display space, at least two target messages are arranged along a preset first path; in a left view of the target message display space, at least two target messages are arranged along a preset second path; wherein the front view of the target message display space is a view that can show front content of the target message.

According to one or more embodiments of the present disclosure, the information interaction method further includes: rotating the target message around a preset longitudinal axis based on a viewing angle of a user, so that content of the target message is visible to the user.

According to one or more embodiments of the present disclosure, the information interaction method further includes: in response to an operation on the target message display space, displaying a first prompt identification, wherein the first prompt identification is configured to indicate a target message display direction that is available at present, and the target message display space is configured to dynamically display the target message along the target message display direction.

According to one or more embodiments of the present disclosure, the information interaction method further includes: when the target message display space dynamically displays the target message along the target message display direction, displaying a second prompt identification in response to receiving a new target message; in response to the second prompt identification being triggered, displaying the new target message in the target message display space.

According to one or more embodiments of the present disclosure, the second prompt identification displays the number of the new target messages.

According to one or more embodiments of the present disclosure, the displaying the target message in the target message display space includes: moving the target message toward inside of the target message display space.

According to one or more embodiments of the present disclosure, if the target message is originated from a current client, the target message moves along a first path; if the target message is originated from a client other than the current client, the target message moves along a second path.

According to one or more embodiments of the present disclosure, the first path is a path between a message editing interface and the target message display space; the message editing interface is configured for editing and sending target messages.

According to one or more embodiments of the present disclosure, if two or more identical first target messages from the same client are determined within a preset time period, moving paths of the two or more identical first target messages are the same.

According to one or more embodiments of the present disclosure, the information interaction method further includes: displaying a third identification corresponding to the two or more identical first target messages in the target message display space, and the third identification is configured to display the number of the first target messages currently arrived in the target message display space.

According to one or more embodiments of the present disclosure, there is provided an information interaction method, including: displaying a virtual reality space, the virtual reality space including a video image display space and a target message display space; displaying a video image in the video image display space; determining a target message and displaying the target message in the target message display space; wherein in the target message display space, projections of at least two target messages in the first direction are not coincident with each other, the first direction being a direction toward which the video image faces.

According to one or more embodiments of the present disclosure, in a front view of the target message display space, the at least two target messages are arranged along a preset first path; in a left view of the target message display space, the at least two target messages are arranged along a preset second path; wherein the front view of the target message display space is a view that can show front content of the target message.

According to one or more embodiments of the present disclosure, the information interaction method further includes: rotating the target message around a preset longitudinal axis based on a viewing angle of a user, so that content of the target message is visible to the user.

According to one or more embodiments of the present disclosure, the information interaction method further includes: in response to an operation on the target message display space, displaying a preset first prompt identification, wherein the first prompt identification is configured to indicate a target message display direction, and the target message display space is configured to dynamically display historical target messages along the target message display direction.

According to one or more embodiments of the present disclosure, the information interaction method further includes: when the target message display space dynamically displays the target message along the target message display direction, displaying a preset second prompt identification in a preset position of the target message display space in response to receiving a new target message; in response to the second prompt identification being triggered, displaying the new target message in the target message display space.

According to one or more embodiments of the present disclosure, the second prompt identification displays the number of the new target messages.

According to one or more embodiments of the present disclosure, there is provided an information interaction device, including: a space display unit configured for displaying a virtual reality space, the virtual reality space including a video image display space and a target message display space; a video image display unit configured for displaying a video image in the video image display space; a message unit configured for determining a target message and displaying the target message in the target message display space; wherein the target message display space is located in front of the video image display space in a first direction, the first direction being a direction toward which the video image faces.

According more embodiments of the present disclosure, there is provided an information interaction device, including: a space display unit configured for displaying a virtual reality space, the virtual reality space including a video image display space and a target message display space; a video image display unit configured for displaying a video image in the video image display space; a message unit configured for determining a target message and displaying the target message in the target message display space; wherein in the target message display space, projections of at least two target messages in the first direction are not coincident with each other, the first direction being a direction toward which the video image faces.

According to one or more embodiments of the present disclosure, there is provided an electronic apparatus including: at least one memory and at least one processor, wherein the memory is configured for storing a program code, and the processor is configured for calling the program code stored in the memory to cause the electronic apparatus to execute the information interaction method provided according to one or more embodiments of the present disclosure.

According to one or more embodiments of the present disclosure, there is provided a non-transient computer storage medium, which stores a program code that, when executed by a computer apparatus, causes the computer apparatus to execute the information interaction method provided according to one or more embodiments of the present disclosure.

The above description is only the preferred embodiments of the present disclosure and the explanation of the applied technical principles. It should be understood by those skilled in the art that the disclosed scope involved in the present disclosure is not limited to technical solutions formed by specific combinations of the above technical features, but also covers other technical solutions formed by any combinations of the above technical features or their equivalent features without departing from the above disclosed concept, such as technical solutions formed by replacing the above features with (but not limited to) technical features with similar functions disclosed the present disclosure.

Furthermore, although operations are depicted in a particular order, this should not be understood as requiring that these operations be performed in the particular order shown or in a sequential order. In a determined circumstance, multitasking and parallel processing may be advantageous. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical actions, it should be understood that the subject matter defined in the appended claims is not necessarily limited to the specific features or actions described above. On the contrary, specific features and actions described above are only exemplary forms of implementing the claims.

What is claimed is:

1. An information interaction method, comprising:

displaying a virtual reality space, the virtual reality space comprising a video image display space and a target message display space;

displaying a video image in the video image display space;

determining a target message and displaying the target message in the target message display space; and wherein the target message display space is located in front of the video image display space in a first direction, the first direction being a direction toward which the video image faces.

2. The method according to claim 1, further comprising at least one of:

the target message display space comprises at least one of at least one display space for displaying text messages or at least one display space for displaying image messages, an orthographic projection of the target message display space on the video image display space is located outside a preset central area of the video image display space, in the target message display space, projections of at least two target messages in the first direction are not coincident with each other, or in a front view of the target message display space, at least two target messages are arranged along a preset first path; in a left view of the target message display space, at least two target messages are arranged along a preset second path; wherein the front view of the target message display space is a view that is able to show front content of the target message.

3. The method according to claim 1, wherein said that an orthographic projection of the target message display space on the video image display space is located outside a preset central area of the video image display space, comprises: the orthographic projection is located on at least one of a left or right side of the preset central area of the video image display area.

4. The method according to claim 1, further comprising at least one of:

rotating the target message around a preset longitudinal axis based on a viewing angle of a user, so that content of the target message is visible to the user, or in response to an operation on the target message display space, displaying a first prompt identification, wherein the first prompt identification is configured to indicate a target message display direction that is available at present, and the target message display space is configured to dynamically display the target message along the target message display direction.

5. The method according to claim 4, further comprising:

when the target message display space dynamically displays the target message along the target message display direction, displaying a second prompt identification in response to receiving a new target message; and in response to the second prompt identification being triggered, displaying the new target message in the target message display space.

6. The method according to claim 5, wherein the second prompt identification displays a number of the new target messages.

7. The method according to claim 1, wherein the displaying the target message in the target message display space, comprises:

moving the target message towards inside of the target message display space.

8. The method according to claim 7, wherein in response to that the target message is originated from a current client, the target message moves along a first path; and in response to that the target message is originated from a client other than the current client, the target message moves along a second path.

9. The method according to claim 8, wherein the first path is a path between a message editing interface and the target message display space; and the message editing interface is configured for editing and sending target messages.

10. The method according to claim 9, wherein in response to that two or more identical first target messages from the same client are determined within a preset time period, moving paths of the two or more identical first target messages are the same.

11. The method according to claim 10, further comprising:

displaying a third identification corresponding to the two or more identical first target messages in the target message display space, and the third identification is configured to display a number of the first target messages currently arrived in the target message display space.

12. An information interaction method, comprising:

displaying a virtual reality space, the virtual reality space comprising a video image display space and a target message display space;

displaying a video image in the video image display space; and determining a target message and displaying the target message in the target message display space, wherein in the target message display space, projections of at least two target messages in the first direction are not coincident with each other, the first direction being a direction toward which the video image faces.

13. The method according to claim 12, wherein in a front view of the target message display space, the at least two target messages are arranged along a preset first path; in a left view of the target message display space, the at least two target messages are arranged along a preset second path;

wherein the front view of the target message display space is a view that is able to show front content of the target message.

14. The method according to claim 12, further comprising at least one of:

rotating the target message around a preset longitudinal axis based on a viewing angle of a user, so that content of the target message is visible to the user, or in response to an operation on the target message display space, displaying a preset first prompt identification, wherein the first prompt identification is configured to indicate a target message display direction, and the target message display space is configured to dynamically display historical target messages along the target message display direction.

15. The method according to claim 12, further comprising:

in response to an operation on the target message display space, displaying a preset first prompt identification, wherein the first prompt identification is configured to indicate a target message display direction, and the target message display space is configured to dynamically display historical target messages along the target message display direction.

16. The method according to claim 15, further comprising:

when the target message display space dynamically displays the target message along the target message display direction, displaying a preset second prompt identification in a preset position of the target message display space in response to receiving a new target message; and in response to the second prompt identification being triggered, displaying the new target message in the target message display space.

17. The method according to claim 16, wherein the second prompt identification displays the number of the new target messages.

18. An electronic apparatus, comprising:

at least one memory and at least one processor;

wherein the memory is configured for storing a program code, and the processor is configured for calling the program code stored in the memory to cause the electronic apparatus to:

display a virtual reality space, the virtual reality space comprising a video image display space and a target message display space;

display a video image in the video image display space;

determine a target message and display the target message in the target message display space;

wherein the target message display space is located in front of the video image display space in a first direction, the first direction being a direction toward which the video image faces.

19. A non-transient computer storage medium, wherein, the non-transient computer storage medium stores a program code that, when executed by a computer apparatus, causes the computer apparatus to execute the method according to claim 1.

20. An electronic apparatus, comprising:

at least one memory and at least one processor;

wherein the memory is configured for storing a program code, and the processor is configured for calling the program code stored in the memory to cause the electronic apparatus to execute the method according to claim 12.

21. A non-transient computer storage medium, wherein, the non-transient computer storage medium stores a program code that, when executed by a computer apparatus, causes the computer apparatus to execute the method according to claim 12.

* * * * *